United States Patent
Moon et al.

(10) Patent No.: US 11,307,134 B2
(45) Date of Patent: Apr. 19, 2022

(54) MEASURING APPARATUS AND METHOD OF OPERATING A MEASURING APPARATUS FOR MEMBRANE FOULING INDEX

(71) Applicant: DOOSAN HEAVY INDUSTRIES & CONSTRUCTION CO., LTD., Changwon-si (KR)

(72) Inventors: Jong Hyuk Moon, Seoul (KR); Yang Oh Jin, Gimhae-si (KR); Hyun Sung Choi, Busan (KR); Sung Hoon Kim, Anyang-si (KR)

(73) Assignee: Doosan Heavy Industries & Construction Co., Ltd, Changwon-si (KR)

( * ) Notice: Subject to any disclaimer, the term of this patent is extended or adjusted under 35 U.S.C. 154(b) by 217 days.

(21) Appl. No.: 16/801,185

(22) Filed: Feb. 26, 2020

(65) Prior Publication Data

US 2020/0191703 A1 Jun. 18, 2020

Related U.S. Application Data

(62) Division of application No. 14/950,535, filed on Nov. 24, 2015, now Pat. No. 10,613,018.

(30) Foreign Application Priority Data

Feb. 12, 2015 (KR) .......................... 10-2015-0021570

(51) Int. Cl.
*G01N 17/00* (2006.01)
*B01D 65/10* (2006.01)
(Continued)

(52) U.S. Cl.
CPC .......... *G01N 17/008* (2013.01); *B01D 61/10* (2013.01); *B01D 61/12* (2013.01); *B01D 65/10* (2013.01); *B01D 2321/40* (2013.01)

(58) Field of Classification Search
CPC .. G01N 17/008; G01N 15/0826; C02F 1/441; C02F 1/442; C02F 2303/20;
(Continued)

(56) References Cited

U.S. PATENT DOCUMENTS

| 4,554,822 A | 11/1985 | Eisenhauer et al. |
| 2015/0013434 A1 | 1/2015 | Hong et al. |

FOREIGN PATENT DOCUMENTS

| CN | 204330543 U | 5/2015 |
| EP | 2803398 A1 | 11/2014 |

(Continued)

OTHER PUBLICATIONS

Schippers, The Modified Fouling Index, a Method of Determining the Fouling Characteristics of Water, Desalination, p. 137-138 (Year: 1980).

(Continued)

*Primary Examiner* — Eric S. McCall
*Assistant Examiner* — Timothy P Graves
(74) *Attorney, Agent, or Firm* — Invenstone Patent, LLC (57) ABSTRACT

A device for measuring the membrane fouling index which can measure the modified fouling index (MFI) and the silt density index (SDI) at the same time and quantify the degree of membrane fouling caused by various kinds of membrane fouling materials, such as particulate materials, colloids, organic matters, and so on, in a short period of time.

10 Claims, 6 Drawing Sheets

(51) Int. Cl.
  *B01D 61/10* (2006.01)
  *B01D 61/12* (2006.01)
(58) Field of Classification Search
  CPC . C02F 2209/445; G01F 23/292; B01D 61/10;
    B01D 61/12; B01D 65/10; B01D 2321/40
  USPC ............................................................ 73/38
  See application file for complete search history.

(56) References Cited

FOREIGN PATENT DOCUMENTS

| | | | | |
|---|---|---|---|---|
| JP | 5750642 | A | 3/1982 | |
| JP | 2012-200631 | A | 10/2012 | |
| JP | 5377553 | B2 | 12/2013 | |
| KR | 10-2010-0057262 | A | 5/2010 | |
| KR | 10-2011-0067744 | A | 6/2011 | |
| KR | 10-2011-0089710 | A | 8/2011 | |
| KR | 2012009837 | A | 11/2012 | |
| KR | 10-2013-0081436 | A | 7/2013 | |
| KR | 20130081436 | A * | 7/2013 | ............ B01D 65/10 |
| KR | 10-2014-0076197 | A | 6/2014 | |

OTHER PUBLICATIONS

Ju Younggil et al. "Nano-colloidal fouling mechanisms in seawater reverse osmosis process evaluated by cake resistance simulator-modified fouling index nanofiltration", (Apr. 2014), pp. 88-96.
Communication dated Jul. 8, 2016 issued by the European Patent Office in counterpart application No. 15201626.7.

* cited by examiner

MEASURING APPARATUS AND METHOD OF OPERATING A MEASURING APPARATUS FOR MEMBRANE FOULING INDEX

CROSS-REFERENCE TO RELATED APPLICATIONS

This application is a divisional of U.S. application Ser. No. 14/950,535, filed Nov. 24, 2015, which claims priority from Korean Patent Application No. 10-2015-0021570, filed Feb. 12, 2015, the contents of which are incorporated herein by reference in its entirety.

BACKGROUND

Field of the Invention

The present disclosure relates to a device for measuring the membrane fouling index, and more particularly, to a device for measuring the membrane fouling index which can measure the modified fouling index (MFI) and the silt density index (SDI) at the same time and quantify the degree of membrane fouling caused by various kinds of membrane fouling materials, such as particulate materials, colloids, organic matters, and so on, in a short period of time.

Background Art

Reverse osmosis and filtration are one of the technologies that have recently gained attention in the water treatment field. Especially, processes using reverse osmosis are now coming into widespread use in the field of seawater desalination or sewage recycling.

According to a Global Water Intelligence special report entitled "Water Reuse Markets 2005-2015: A Global Assessment & Forecast", global water reuse capacity is expected to grow from 2 million tons a day today to 5.4 million tons per day in 2015. Over the same period, global seawater desalination capacity is expected to grow from 3 million tons per day to 6.2 million tons per day. Besides, reverse osmosis and filtration are advanced water treatment technologies which are getting attention in the field of surface water and ground water treatment, industrial wastewater treatment, and zero-discharge recycling.

However, membrane fouling, i.e., filtration membrane fouling, is an obstacle to the commercialization of reverse osmosis and filtration. Membrane fouling refers to a situation in which foreign substances present in water flowing into a filtration membrane are deposited or adsorbed on the surface of the filtration membrane in a way that degrades the water permeability of the filtration membrane.

There are various kinds of foreign substances causing membrane fouling, for instance, suspended particles, colloids, organic matters, microbes, and mineral salts such as calcium salts. It is considerably difficult to predict membrane fouling because of these various foreign substances causing membrane fouling.

In general, the silt density index (SDI) is used to predict membrane fouling occurring in reverse osmosis or filtration. The SDI is a measure of possibility at which membrane fouling will occur. The SDI is a method of measurement where influent water is passed through a 0.45 μm pore size filter with 47 mm diameter at a pressure of 30 psi to measure the degree of fouling caused by suspended solids (SS).

As an example, in case of SDI15, the initial time T0 to infiltrate water of 500 ml is measured, and then the time T1 to infiltrate water of 500 ml is measured again after 15 minutes. The ratio of T0 to T1 is used as a measure of membrane fouling. Alternatively, SDI10 may be used.

The SDI measuring method is currently the most widely used method to predict the propensity of membrane fouling by influent water in reverse osmosis or filtration. Generally, if a value measured through the SDI measuring method, namely, an SDI value is less than 3, it is considered to be acceptable. However, if an SDI value is greater than 5, it indicates that severe fouling will occur.

However, the above-described SDI measuring method is an indirect method of evaluating the membrane fouling potential by suspended particles larger than 0.45 μm. So, the SDI measuring method has a limit in that it cannot evaluate the effects of fine materials, such as colloids or organic matters, smaller than 0.45 μm.

Although modified fouling index (MFI) can be used to compensate for the above-mentioned problem of the SDI, the MFI and the SDI have a limit in measurable membrane foulants because the MFI and the SDI basically use the same filtration membrane.

To overcome the problem, methods such as modified fouling index-ultrafilter (MFI-UF) or modified fouling index-nanofilter (MFI-NF) were proposed. However, these methods have difficulty in predicting effects of various types of foulant mixtures that may occur in a filtration membrane because they also use a single type of membrane.

Therefore, various attempts to measure the degree of membrane fouling by various kinds of membrane foulants have been made. As an example, the present inventor suggested earlier-filed Korean Patent Publication No. 10-2013-0081436 titled 'Device for measuring pollution index of membrane' which can quantify the degree of membrane fouling caused by various kinds of membrane foulants by arranging hydrophilic microfilter membranes (MF), hydrophilic ultrafilter membranes (UF) and hydrophilic nanofilter membranes (NF) in series.

Moreover, the present inventor proposed earlier-filed Korean Patent Publication No. 2011-0089710 entitled 'Device for predicting pollution index of membrane'. In Korean Patent Publication No. 2011-0089710, the device for predicting the pollution index of a membrane can itemize membrane foulants and evaluate the degree of membrane fouling by the membrane foulants by connecting a plurality of filtration membranes with different filtration characteristics in series.

However, such conventional methods have a disadvantage in that it is necessary to measure the membrane fouling index two times or more and the conventional methods cannot rapidly cope with a change in water quality because it takes a long time to measure due to the repeated measurement.

SUMMARY

Accordingly, the present disclosure has been made in view of the above-mentioned problems occurring in the prior art, and it is an object of the present disclosure to provide a device for measuring the membrane fouling index which can measure the modified fouling index (MFI) and the silt density index (SDI) at the same time and quantify the degree of membrane fouling caused by various kinds of membrane foulants by arranging filtration membranes in series.

To accomplish the above object, according to the present disclosure, there is provided a device for measuring the membrane fouling index, including: a raw water supplying unit for supplying raw water to be measured; a filtration membrane; a raw water supply line which connects the raw water supplying unit with the filtration membrane; a flow rate measuring unit for measuring a flow rate; and an SDI/MFI measurement line which connects the filtration membrane with the flow rate measuring unit, wherein the modified fouling index (MFI) and the silt density index (SDI) are measured at the same time using a flow rate passing through the SDI/MFI measurement line.

In this instance, the device for measuring membrane fouling index further includes a level sensor which is mounted on the SDI/MFI measurement line to measure the SDI. Alternatively, the device for measuring membrane fouling index further includes a field equipment connecting unit for connecting field equipment for measuring the SDI to the SDI/MFI measurement line. Moreover, the device for measuring membrane fouling index further includes a pressure controller which is mounted at a filtration membrane inlet of the raw water supply line to control pressure of raw water flown into the filtration membrane.

In an another aspect, there is provided a device for measuring the membrane fouling index, including: a raw water supplying unit for supplying raw water to be measured; a first filtration membrane; a raw water supply line which connects the raw water supplying unit with the first filtration membrane; a level sensor for measuring the SDI from permeated water passing through the first filtration membrane; a flow rate measuring unit for measuring a flow rate; an MFI measurement line for connecting the flow rate measuring unit with the level sensor; a buffer tank which is mounted on the MFI measurement line to store the first permeated water discharged from the level sensor; and a second filtration membrane which is mounted between the flow rate measuring unit and the buffer tank mounted on the MFI measurement line and has filtration characteristics different from the first filtration membrane.

In this instance, the device for measuring membrane fouling index further includes a valve which is formed on the MFI measurement line to make the first permeated water stored in the level sensor flow into the buffer tank. In addition, the SDI measurement in the level sensor and the MFI measurement using the flow rate passing through the MFI measurement line are achieved at the same time.

Furthermore, the device for measuring membrane fouling index further includes a pressure controller which is mounted at an inlet of the second filtration membrane to control pressure of the first permeated water flown into the second filtration membrane. Moreover, pores of the second filtration membrane are smaller than those of the first filtration membrane. Additionally, the level sensor is replaceable with field equipment for measuring the SDI.

In a further aspect, there is provided a device for measuring the membrane fouling index, including: a raw water supplying unit for supplying raw water to be measured; a first filtration membrane; a raw water supply line which connects the raw water supplying unit with the first filtration membrane; a flow rate measuring unit for measuring a flow rate; an SDI/MFI-1 measurement line which connects the flow rate measuring unit with the first filtration membrane; a level sensor which is mounted on the SDI/MFI-1 measurement line to measure the SDI; an SDI/MFI-2 measurement line which connects the flow rate measuring unit with the level sensor to be connected with the SDI/MFI-1 measurement line; a buffer tank which is mounted on the SDI/MFI-2 measurement line to store the first permeated water discharged from the level sensor; and a second filtration membrane which is mounted between the flow rate measuring unit and the buffer tank mounted on the SDI/MFI-2 measurement line and has filtration characteristics different from the first filtration membrane.

In this instance, the device for measuring membrane fouling index further includes a valve which is formed on the MFI-2 measurement line to make the first permeated water stored in the level sensor flow into the buffer tank. Furthermore, the SDI measurement in the level sensor, the MFI-1 measurement of the first filtration membrane using the flow rate passing through the SDI/MFI-1 measurement line, and the MFI-2 measurement of the second filtration membrane using the flow rate passing through the MFI-2 measurement line are achieved at the same time.

In addition, the device for measuring membrane fouling index further includes a pressure controller which is mounted at an inlet of the second filtration membrane to control pressure of the first permeated water flown into the second filtration membrane. Moreover, pores of the second filtration membrane are smaller than those of the first filtration membrane. Additionally, the level sensor is replaceable with field equipment for measuring the SDI.

According to the present disclosure, the device for measuring the membrane fouling index can measure the membrane fouling index of the modified fouling index (MFI) and the silt density index (SDI) at the same time to enhance precision in measurement of membrane fouling and measure the degree of membrane fouling caused by various kinds of membrane fouling materials in a short period of time.

BRIEF DESCRIPTION OF THE DRAWINGS

The above and other objects, features and advantages of the disclosure will be apparent from the following detailed description of the preferred embodiments of the invention in conjunction with the accompanying drawings, in which.

DETAILED DESCRIPTION

Reference will be now made in detail to exemplary embodiments of the disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

The conventional devices for measuring membrane fouling index have disadvantages in that it is necessary to measure the membrane fouling index two times or more by arranging various kinds of filtration membranes in series and in that they cannot measure just a single kind of membrane fouling index.

Differently from the conventional devices, a device for measuring the membrane fouling index according to the present invention can itemize effects of various foulant mixtures which may occur on filtration membranes and measure the modified fouling index (MFI) and the silt density index (SDI) at the same time.

Figure 2:
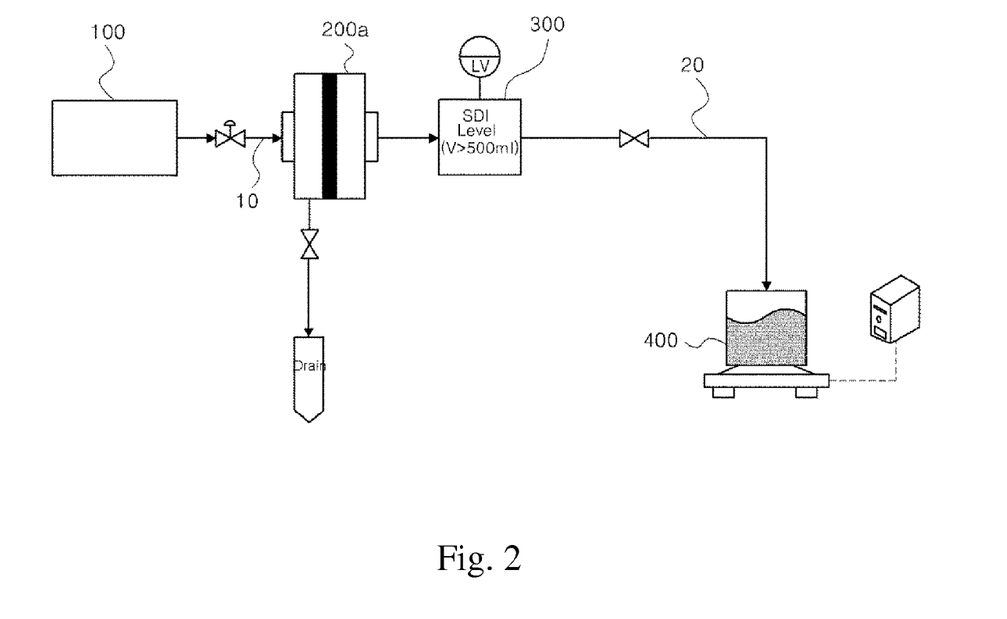
FIG. 2 is a schematic diagram of the device for measuring the membrane fouling index according to the first preferred embodiment.

In detail, as shown in FIG. 2, the device for measuring the membrane fouling index according to a first preferred embodiment includes: a raw water supplying unit 100 for supplying raw water to be measured; a filtration membrane 200a; a raw water supply line 10 which connects the raw water supplying unit with the filtration membrane; a flow rate measuring unit 400 for measuring a flow rate; and an SDI/MFI measurement line 20 which connects the filtration membrane with the flow rate measuring unit.

A raw water supplying unit 100 serves to supply raw water to be measured, and is configured to supply raw water in a compressed state by using compressed air or a pump. In a seawater desalination plant, raw water may be supplied in a compressed state by a high pressure pump of the plant.

The filtration membrane 200a may be one of various kinds of filtration membranes, and preferably, a 0.45 μm pore size filtration membrane which can measure the SDI and the MFI at the same time.

The raw water supply line 10 connects the raw water supplying unit 100 with a first filtration membrane 200a so that raw water can flow from the raw water supplying unit 100 to the first filtration membrane 200a. Here, a pressure controller for controlling pressure of raw water supplied from the raw water supplying unit 100 may be mounted on the raw water supply line 10.

The flow rate measuring unit 400 measures a flow rate, and in this instance, can measure the MFI and the SDI using a flow rate passing the first filtration membrane 200a through the SDI/MFI measurement line 20.

Figure 1:
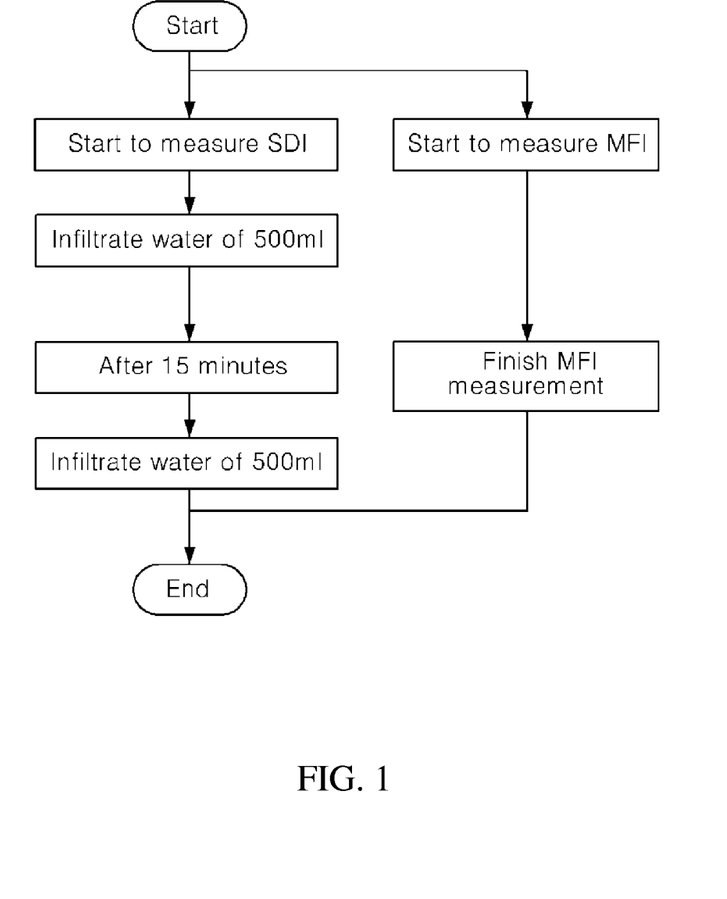
FIG. 1 is a flow chart of a device for measuring the membrane fouling index according to a first preferred embodiment.

That is, as shown in FIG. 1, in a case that SDI15 is measured, through time how long it takes water of 500 ml to first flow from the flow rate measuring unit 400 and the time how long it takes water of 500 ml to flow again after 15 minutes, the SDI is measured, and at the same time, the MFI is also measured through measurement of a change in flow rate with time.

Furthermore, the SDI may be measured not using the flow rate measuring unit but using a level sensor. Therefore, a level sensor 300 for measuring the SDI is additionally mounted on the SDI/MFI measurement line 20, so that the SDI measurement is carried out in the level sensor 300 and the MFI measure is carried out in the flow rate measuring unit 400. In this instance, in lieu of the level sensor 300, a general field equipment for measuring the SDI may be connected and used.

Figure 4:
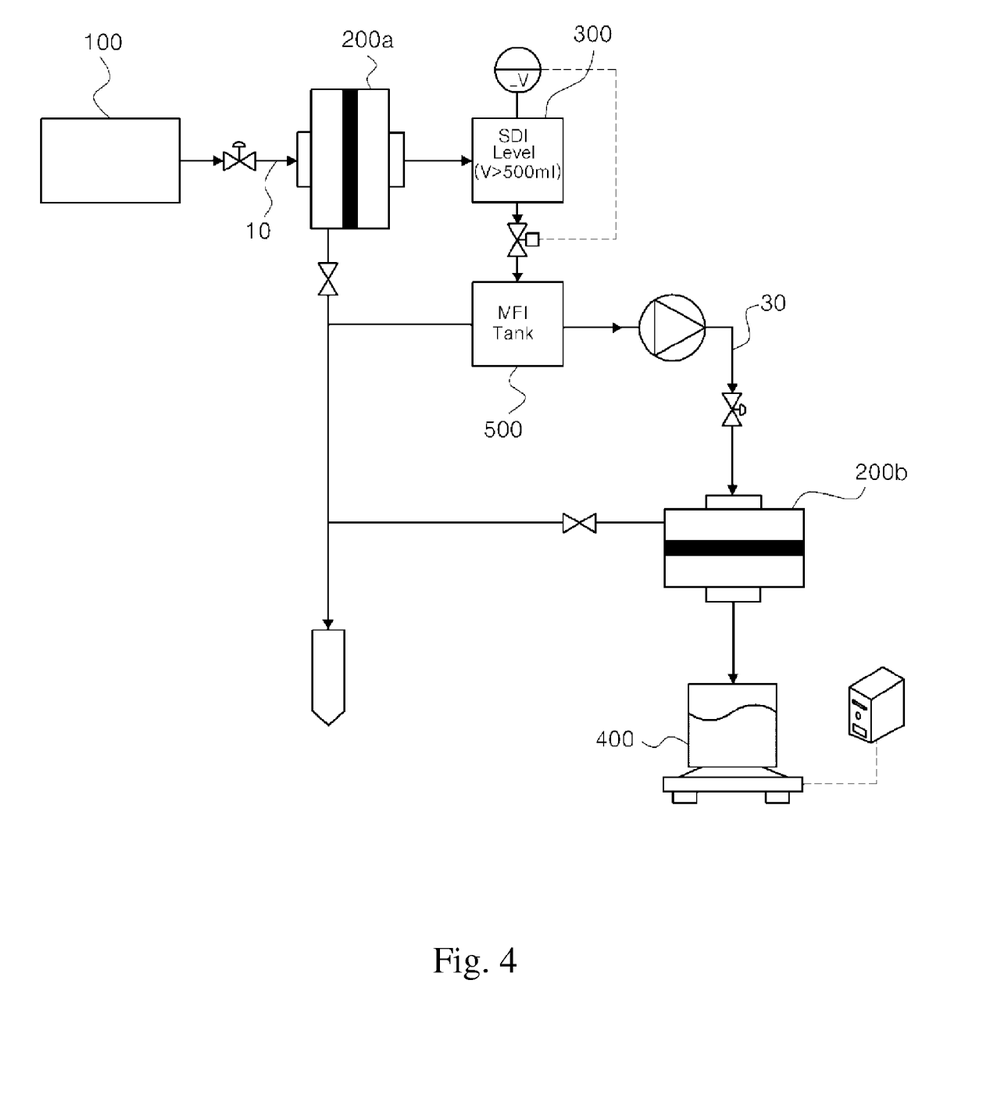
FIG. 4 is a schematic diagram of the device for measuring the membrane fouling index according to the second preferred embodiment.

In the meantime, as shown in FIG. 4, the device for measuring the membrane fouling index according to a second preferred embodiment of the present invention includes: a raw water supplying unit 100 for supplying raw water to be measured; a first filtration membrane 200a; a raw water supply line 10 which connects the raw water supplying unit 100 with the first filtration membrane 200a; a level sensor 300 for measuring the SDI from permeated water passing through the first filtration membrane 200a; a flow rate measuring unit 400 for measuring a flow rate; an MFI measurement line 30 for connecting the flow rate measuring unit 400 with the level sensor 300; a buffer tank 500 which is mounted on the MFI measurement line to store the first permeated water discharged from the level sensor 300; and a second filtration membrane 200b which is mounted between the flow rate measuring unit 400 and the buffer tank 500 mounted on the MFI measurement line and has filtration characteristics different from the first filtration membrane.

Detailed descriptions of the raw water supplying unit 100, the first filtration membrane 200a and the raw water supply line 10 are the same as the first preferred embodiment, and the level sensor 300 measures the SDI from the flow rate passing through the first filtration membrane 200a.

Additionally, the second filtration membrane 200b is formed on the MFI measurement line 30 which connects the flow rate measuring unit 400 with the level sensor 300. The second filtration membrane 200b is to filter smaller particulate materials rather than the first filtration membrane 200a. Because the first filtration membrane 200a first filters large particulate materials, effects by particles influencing on membrane fouling of the second filtration membrane 200b can be measured more accurately.

For instance, in a case that a hydrophilic microfilter membranes (MF) is used as the first filtration membrane 200a and a hydrophilic ultrafilter membranes (UF) is used as the second filtration membrane 200b, general suspended particles are first settled or adsorbed to the surface of the first filtration membrane 200a, and then, colloids are settled or adsorbed to the surface of the second filtration membrane 200b. Therefore, the device for measuring the membrane fouling index according to the present disclosure can distinguish membrane fouling caused by the general suspended particles from membrane fouling caused by the colloids and evaluate membrane fouling.

In this instance, it is preferable that a pressure controller be mounted to control pressure of first permeated water flown into the second filtration membrane 200b. The level sensor 300 may be replaced with a generally used field equipment for measuring the SDI.

Now, the operation process of the device for measuring membrane fouling according to the present disclosure will be described. First, the level sensor 300 measures the SDI through a flow rate passing through the first filtration membrane 200a. As an example, SDI 15 will be described. The SDI15 measures time T0 to infiltrate water of 500 ml and time T1 to infiltrate water of 500 ml again after 15 minutes, and then, indicates the measured times into a ratio. The level sensor 300 stores the initial permeated water of 500 ml after starting filtration.

When the initial time T0 is measured after the initial flow rate of the water of 500 ml has completely flowed, the initial permeated water flows into the buffer tank 500 before the time T1 for measuring the SDI is measured. In order to make the initial permeated water flow into the buffer tank 500, a valve may be formed between the level sensor 300 and the buffer tank 500. In this instance, the valve is opened until flow rate measurement for SDI measurement is needed after 15 minutes.

The initial permeated water which flowed into the buffer tank 500 penetrates the second filtration membrane 200b through the MFI measurement line 30 extending from the level sensor 300 to the flow rate measuring unit 400, and then, flows to the flow rate measuring unit 400. In this instance, the MFI of the second filtration membrane 200b can be measured through the flow rate measured by the flow rate measuring unit 400.

Figure 3:
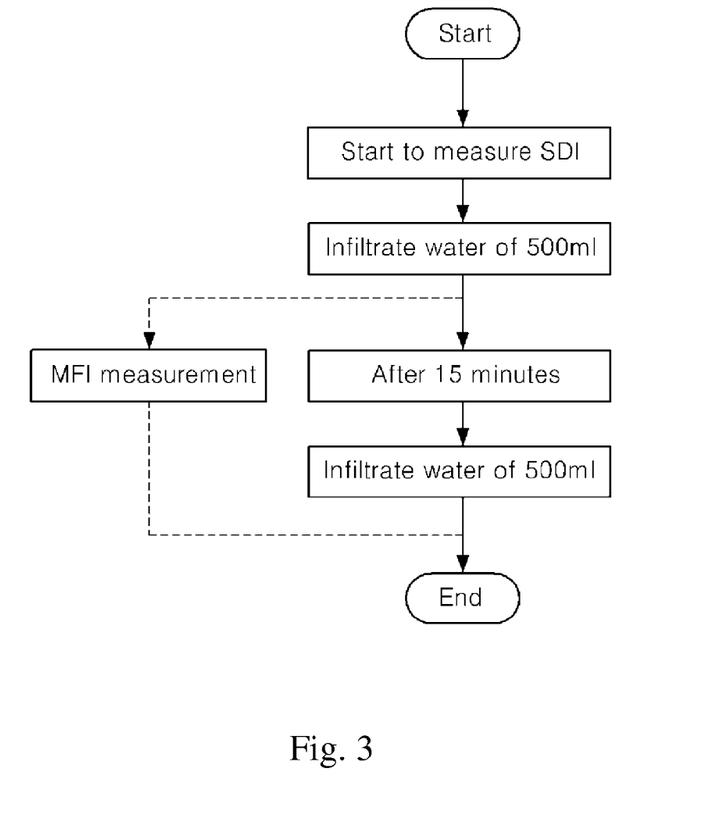
FIG. 3 is a flow chart of a device for measuring the membrane fouling index according to a second preferred embodiment.

That is, as shown in the flow chart of FIG. 3, the water of 500 ml which first penetrated the first filtration membrane 200a at the time of SDI measurement is used for measuring the MFI of the second filtration membrane 200b, so that the MFI of the second filtration membrane 200b is measured using the flow rate passing through the MFI measurement line 30 while the SDI of the first filtration membrane 200a is measured in the level sensor 300.

Therefore, the device for measuring the membrane fouling index according to the present embodiment can compensate for the problem of the conventional SDI measuring methods that cannot evaluate effects of fine materials, such as colloids or organic matters, smaller than 0.45 μm, and can measure two types of membrane fouling index in a short period of time.

Figure 6:
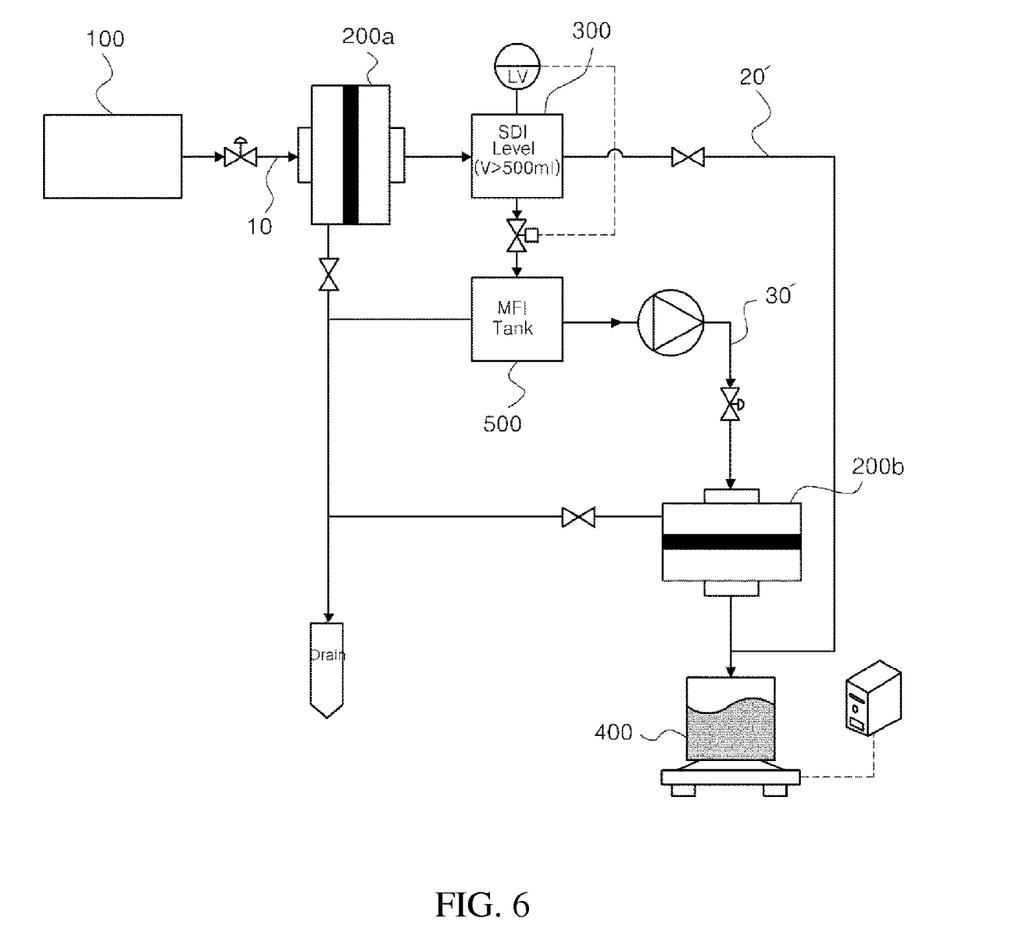
FIG. 6 is a schematic diagram of the device for measuring the membrane fouling index according to the third preferred embodiment.

In the meantime, as shown in FIG. 6, the device for measuring the membrane fouling index according to a third preferred embodiment includes: a raw water supplying unit 100 for supplying raw water to be measured; a first filtration membrane 200a; a raw water supply line 10 which connects the raw water supplying unit 100 with the first filtration membrane 200a; a flow rate measuring unit 400 for measuring a flow rate; an SDI/MFI-1 measurement line 20' which connects the flow rate measuring unit with the first filtration membrane; a level sensor 300 which is mounted on the SDI/MFI-1 measurement line 20' to measure the SDI; an SDI/MFI-2 measurement line 30' which connects the flow rate measuring unit 400 with the level sensor 300 to be connected with the SDI/MFI-1 measurement line 20'; a buffer tank 500 which is mounted on the SDI/MFI-2 measurement line 30' to store the first permeated water discharged from the level sensor 300; and a second filtration membrane 200b which is mounted between the flow rate measuring unit 400 and the buffer tank 500 mounted on the SDI/MFI-2 measurement line 30' and has filtration characteristics different from the first filtration membrane 200a.

The third preferred embodiment is a combination of the first preferred embodiment and the second preferred embodiment in such a way that the SDI measurement of the first filtration membrane 200a in the level sensor 300, the MFI measurement of the first filtration membrane 200a using the flow rate passing through the SDI/MFI-1 measurement line 20' and the MFI measurement of the second filtration membrane 200b using the flow rate passing through the MFI-2 measurement line 30' can be achieved at the same time.

In other words, the operation process of the device for measuring the membrane fouling index having the above structure will be described in more detail. First, the SDI is measured in the level sensor 300 through the flow rate passing through the first filtration membrane 200a. When the initial time T0 is measured after the initial flow rate of the water of 500 ml has completely flowed, the initial permeated water flows into the buffer tank 500 before the time T1 for measuring the SDI is measured.

The initial permeated water that has flowed into the buffer tank 500 penetrates the second filtration membrane 200b through the MFI measurement line 30 extending from the level sensor 300 to the flow rate measuring unit 400, and then, flows to the flow rate measuring unit 400. In this instance, the MFI of the second filtration membrane 200b can be measured through the flow rate measured by the flow rate measuring unit 400.

In the meantime, while the SDI is measured in the level sensor 300 through the time how long it takes the water of 500 ml to flow first and the time how long it takes the water of 500 ml to flow again after 15 minutes (in the case of measurement of SDI 15), the MFI of the first filtration membrane 200a is measured by measuring the flow rate passing through the SDI/MFI-1 measurement line 20' which connects the flow rate measuring unit with the first filtration membrane.

Figure 5:
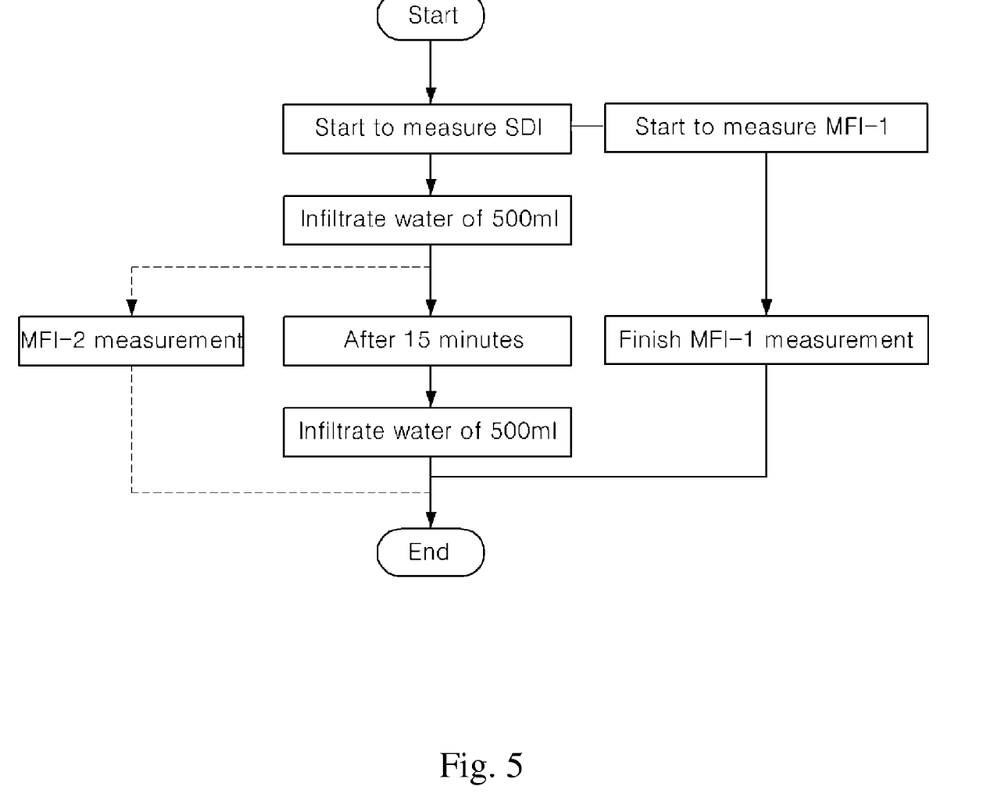
FIG. 5 is a flow chart of a device for measuring the membrane fouling index according to a third preferred embodiment.

That is, as shown in the flow chart of FIG. 5, the water of 500 ml which first penetrated the first filtration membrane 200a at the time of SDI measurement is used for measuring the MFI of the second filtration membrane 200b, so that the present disclosure can measure the SDI and the MFI of the first filtration membrane 200a and the MFI of the second filtration membrane 200b using the flow rate passing through the MFI-2 measurement line 30' at the same time.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A device for measuring membrane fouling index (MFI), the device comprising:
    a raw water supplying unit configured to supply raw water to be measured;
    a first filtration membrane exhibiting first filtration characteristics for passing first permeated water;
    a second filtration membrane exhibiting second filtration characteristics different from the first filtration membrane characteristics;
    a raw water supply line connecting the raw water supplying unit with the first filtration membrane;
    a level sensor configured to store the first permeated water in order to measure a silt density index (SDI) from the first permeated water;
    a flow rate measuring unit configured to measure a flow rate;
    an SDI/MFI-1 measurement line which connects the flow rate measuring unit with the first filtration membrane through the level sensor and is configured to provide to the flow rate measuring unit an MFI-1 measurement of the first filtration membrane using a flow rate of water passing through the SDI/MFI-1 measurement line;

an SDI/MFI-2 measurement line, separate from the SDI/MFI-1 measurement line, which connects the flow rate measuring unit with the level sensor and is configured to provide to the flow rate measuring unit an MFI-2 measurement of the second filtration membrane using a flow rate of water passing through the SDI/MFI-2 measurement line; and a buffer tank mounted on the SDI/MFI-2 measurement line to store the first permeated water discharged from the level sensor, wherein the second filtration membrane is mounted on the SDI/MFI-2 measurement line between the flow rate measuring unit and the buffer tank to pass second permeated water.

2. The device according to claim 1, wherein the MFI-1 and MFI-2 measurements are obtained concurrently with the SDI measurement of the first filtration membrane by the level sensor.

3. The device according to claim 1, wherein the SDI and MFI-1 measurements of the first filtration membrane are obtained concurrently with the MFI-2 measurement of the second filtration membrane using the flow rate passing through the MFI-2 measurement line.

4. The device according to claim 1, further comprising:
a pressure controller which is mounted at an inlet of the second filtration membrane to control pressure of the first permeated water that flowed into the second filtration membrane.

5. The device according to claim 1, further comprising:
a valve provided on the MFI-2 measurement line to cause the first permeated water stored in the level sensor to flow into the buffer tank.

6. The device according to claim 1, wherein pores of the second filtration membrane are smaller than pores of the first filtration membrane.

7. A method of operating a device for measuring membrane fouling index (MFI), the device comprising a raw water supplying unit; a first filtration membrane exhibiting first filtration characteristics; a second filtration membrane exhibiting second filtration characteristics different from the first filtration membrane characteristics; a raw water supply line connecting the raw water supplying unit with the first filtration membrane; a level sensor; a flow rate measuring unit; an SDI/MFI-1 measurement line connecting the flow rate measuring unit with the first filtration membrane through the level sensor; an SDI/MFI-2 measurement line, separate from the SDI/MFI-1 measurement line, connecting the flow rate measuring unit with the level sensor; and a buffer tank mounted on the SDI/MFI-2 measurement line, wherein the flow rate measuring unit is connected to a computer processor for executing an operation process of the device, wherein the second filtration membrane is mounted on the SDI/MFI-2 measurement line between the flow rate measuring unit and the buffer tank, the method comprising:

supplying raw water to be measured from the raw water supplying unit, through the raw water supply line to the first filtration membrane;

measuring a silt density index (SDI) from the first permeated water by storing the first permeated water in the level sensor, discharging the first permeated water, and enabling the first permeated water discharged by the level sensor to reach the flow rate measuring unit through the MFI-2 measurement line;

storing the first permeated water discharged from the level sensor in the buffer tank;

measuring an MFI-1 value of the first filtration membrane using a flow rate of water passing through the SDI/MFI-1 measurement line; and measuring an MFI-2 value of the second filtration membrane using a flow rate of water passing through the SDI/MFI-2 measurement line.

8. The method according to claim 7, wherein the MFI-1 and MFI-2 measurements are obtained concurrently with the SDI measurement of the first filtration membrane by the level sensor.

9. The method according to claim 7, further comprising:
controlling a pressure controller mounted at an inlet of the second filtration membrane to control pressure of the first permeated water that flowed into the second filtration membrane so that the first permeated water passed through the first filtration membrane at a time of the SDI measurement is used for measuring the MFI-2 of the second filtration membrane before the SDI and MFI-1 measurements are complete.

10. The method according to claim 7, further comprising:
controlling a valve provided on the MFI-2 measurement line to cause the first permeated water stored in the level sensor to pass through the valve and to flow into the buffer tank.

* * * * *